United States Patent [19]

Bottiglia

[11] 4,296,300

[45] Oct. 20, 1981

[54] METHOD AND DEVICE FOR WELDING PROTECTED METAL PARTS

[75] Inventor: Augusto Bottiglia, Milan, Italy

[73] Assignee: Sio-Societa per l'Industria Dell'Ossigenc e di Altri Gas, Milan, Italy

[21] Appl. No.: 971,105

[22] Filed: Dec. 19, 1978

[30] Foreign Application Priority Data

Dec. 23, 1977 [IT] Italy ............................ 31263 A/77

[51] Int. Cl.³ .............................................. B23K 9/23
[52] U.S. Cl. ................................... 219/61.7; 219/136; 219/137 R; 228/46; 228/222
[58] Field of Search ................ 219/137 R, 74, 61.7, 219/136; 228/46, 222

[56] References Cited

U.S. PATENT DOCUMENTS

| | | | |
|---|---|---|---|
| 2,280,150 | 4/1942 | Hasse et al. | |
| 2,357,402 | 9/1944 | Hasse et al. | |
| 2,862,294 | 12/1958 | Philip | 219/137 R X |
| 2,959,666 | 11/1960 | Tuthill | 219/74 |
| 3,798,407 | 3/1974 | Becker | 228/222 X |
| 4,152,568 | 5/1979 | Yamaguchi | 219/61.7 |

FOREIGN PATENT DOCUMENTS

| | | | |
|---|---|---|---|
| 1905926 | 2/1969 | Fed. Rep. of Germany | 219/137 R |
| 1900509 | 8/1970 | Fed. Rep. of Germany | 219/137 R |
| 2125300 | 11/1971 | Fed. Rep. of Germany | 219/137 R |
| 458569 | 4/1966 | Switzerland | |
| 1066625 | 4/1967 | United Kingdom | |
| 332962 | 7/1972 | U.S.S.R. | 219/137 R |

*Primary Examiner*—Elliot A. Goldberg
*Attorney, Agent, or Firm*—Lee C. Robinson, Jr.

[57] ABSTRACT

A method and apparatus for welding or brazing of sheetmetal or plate covered with a temperature degradable protective coat, such as zinc or plastic. A cooling saddle supplied with liquid nitrogen is arranged on the side of the plate opposite that adjacent the welding torch. During the formation of the weld, gaseous nitrogen escapes through holes in the saddle to cool the protective coat and keep it from melting or volatilizing.

9 Claims, 5 Drawing Figures

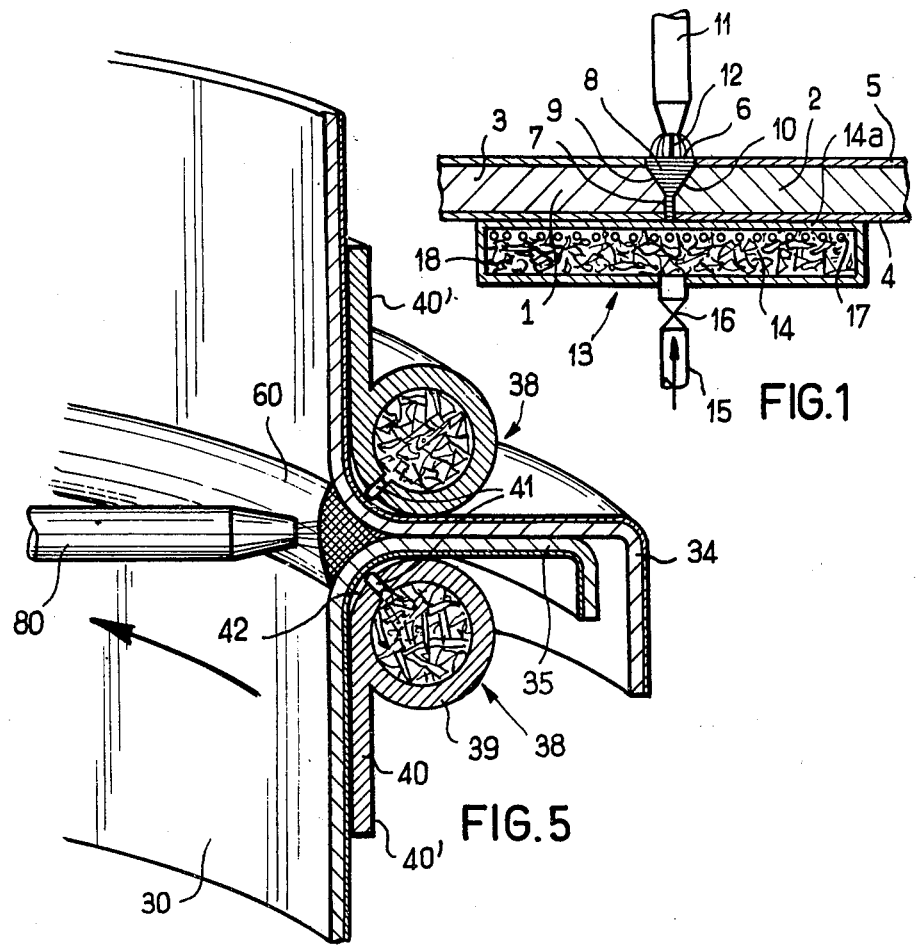
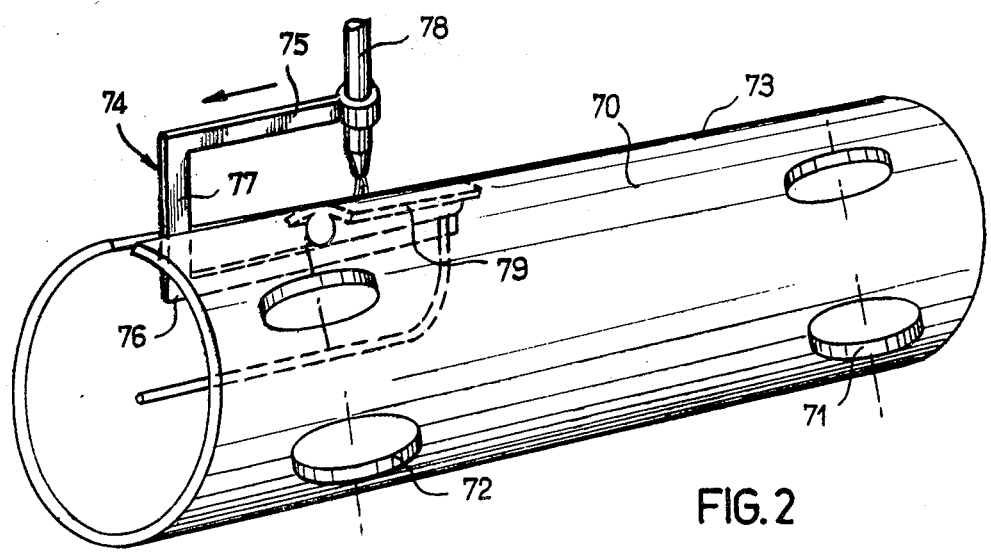

METHOD AND DEVICE FOR WELDING PROTECTED METAL PARTS

BACKGROUND OF THE INVENTION

This invention relates to the welding of protected metal parts, for example sheetmetal sections covered with a material which can volatilize at relatively low temperatures, in any case, lower than the temperature of welding or brazing the parts, for example zinc, synthetic resins, etc. . .

Generally, to avoid deteriorating or eliminating the coating from welded parts, welding has been renounced and other assembly techniques have been used, such as bolting or clipping, or welding has been performed but a later operation is performed to repair and re-cover the deteriorated surfaces.

These methods have their disadvantages. Assembly operations such as bolting and clipping are very expensive and do not provide a really leaktight joint which is required for a certain number of applications. The later operation of re-covering is an additional production operation, and if the later treatment involves dipping, as for galvanizing and certain paint coating techniques, there may be problems because of the large dimensions of the assemblies with their inherent handling difficulties.

It has already been proposed, with resistance welding pieces which are coated with protective insulating coating, to spray onto the parts to be welded, in the zone where the electrodes are working, a fluid containing a substance which conducts electricity and which can be cooled, so as to simultaneously cool and clean the welding electrodes. As fluid, cooled water is used. This method is applicable to resistance welding and may in no case be used for electric arc welding. Moreover, the use of water, simply poured into the gap between the electrode and the part, would tend to have adverse effects rather than beneficial effects since not only would it disturb the proper function of the arc, but, because of the limitation imposed by the cooling temperature, it would require large quantities of water which, when cooling the bodies of the parts, would considerably disturb the melting metal, and would even be able to inhibit its formation.

SUMMARY

This invention aims to weld metal pieces which are protected by an easily volatilizable material, without deteriorating the coating on at least one surface of the pieces. According to the invention, cooling is exclusively performed on the coating, in a zone, on the back of the welding zone and the cooling fluid is cryogenic fluid at very low temperature, for example liquid nitrogen. By strictly limiting the effect of the cooled fluid to the back of the welding zone, any disturbance in the welding operation is minimized. Moreover, the use of fluid at very low temperature results in an abrupt temperature transfer which does not disturb the fused metal. This intense localized cooling technique is quite different from the technique for preventing deformation due to welding heat shock by cooling the whole joint to be welded using a support designed for the circulation of cooling water. The latter technique has been used exclusively for metal parts without coating, and the cooling extended all the way through the piece by a fluid with strong thermal power but at a not very cold temperature so as to provide, next to the melting metal, a temperature which is less than the atmospheric temperature, to definitely prevent any heat transfer across or along the piece which would deform it. In the method according to the invention, there is no intention of lowering the temperature of the coating, but only limiting its rise to keep it below the temperature of volatilizing or melting.

In a preferred operating method, the coating is pre-cooled before the welding operation begins.

The invention also concerns a welding device including welding apparatus and cooling apparatus. The cooling apparatus includes a cooling saddle having a feed conduit with a valve, and a wall of heat conductive material whose shape is adapted to the piece to be welded. The saddle has side and lengthwise extensions in relation to the joint which are strictly limited to the objective which is to limit the increase in the temperature of the coating to a permissible level.

BRIEF DESCRIPTION OF THE DRAWINGS

The appended drawings show the characteristics and advantages of the invention:

FIG. 1 is a cross section of a welding device adapted to the edge to edge welding of sheetmetal;

FIG. 2 is a perspective view of a variant of the welding device adapted to the fabrication of tubes;

FIG. 5 is a view, larger scale, cross section, of a part of the silo from FIGS. 3 and 4.

DESCRIPTION OF CERTAIN PREFERRED EMBODIMENTS

Figure 3:
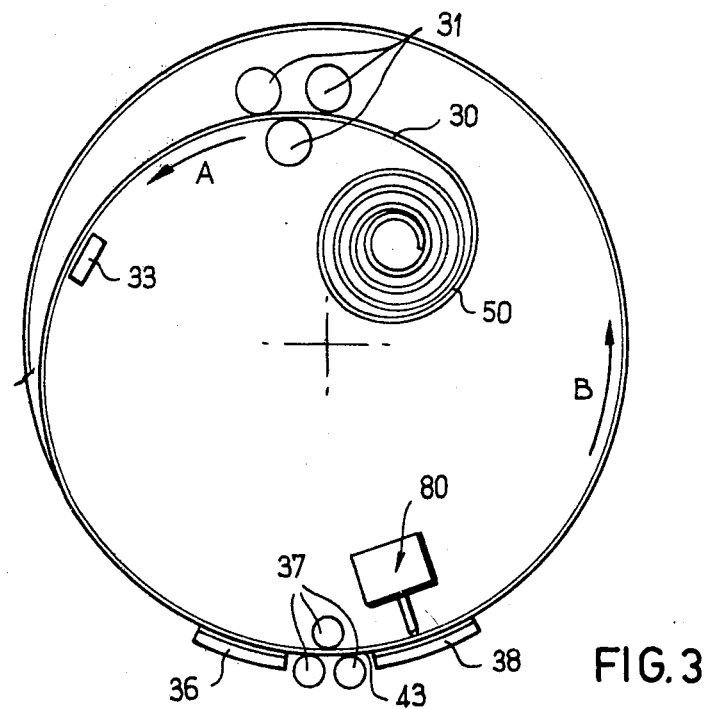
FIG. 3 is a schematic transverse view of a silo being built according to the invention.

In FIG. 1, two metal sheets, 1 and 2, each comprising a steel body 3 and a protective zinc coating 4 on one face (there may be a protective coating 5 on the other face), are arranged edge to edge along a weld joint 6. The joint 6 has a narrowed base 7 and a body 8, with a flared shape, generally limited by chamfers 9 and 10. The weld is formed with a torch 11, with filler rod 12. On the opposite side from the torch in relation to sheets 1 and 2, a cooling saddle 13 has been arranged, made up of a housing 14 of thermally conductive material, such as copper, with a feed conduit 15, with a valve 16, for liquid nitrogen, plus discharge holes 17 along an upper edge of a front panel 18. The saddle 13 and the torch 11 are arranged facing each other, and the housing 14 extends along the joint, for example about thirty centimeters, with a lesser extension across the joint. During the welding operation, cooling saddle 13 is held in a fixed position in relation to torch 11, or the sheets 1 and 2 are fixed and torch 11 and saddle 13 are mounted on synchronized shift supports, or the torch 11 and saddle 13 are fixed and the sheets are supported by supports to shift them (not shown).

In operation, the housing 14 is supplied with liquid nitrogen by conduit 15. The nitrogen in housing 14 vaporizes and cools the whole of housing 14 and in particular its upper wall 14a which is in contact with the protective coating 4 of sheets 1 and 2. The vaporized nitrogen escapes through holes 17 on the front panel which is in front of the joint to be welded. It is recommended to improve the heat transfer to place conducting elements in housing 14, for example copper filings. The heat transfer occurs primarily by conduction, face against face, between the wall of the housing 14a and the coating 4 and, as a side effect, by the vaporized nitrogen escaping through holes 17 toward a part of coating 4 which is located upstream from the welding torch 11. Practically speaking, the structure of cooling saddle 13, the thicknesses of protective coating 4 and of the sheetmetal body 3, as well as the welding speed are fixed, so correct action of the cooling saddle is ensured by adjusting liquid nitrogen feed valve 16 so that at the hottest point of coating 4, whose temperature can be monitored by a thermocouple properly located, no volatilization of this coating takes place.

Instead of making the gaseous nitrogen escape holes on a front wall, they also may extend wholly or partially, through contact wall 14a of housing 14. Hollows or grooves (not shown) are advantageously arranged in this wall 14a so the gaseous nitrogen can escape without disturbing the contact of the wall 14a with the coating 4.

Referring to FIG. 2, a tube 70 formed into a cylinder by a series of roller elements 71 and 72, if fitted with a welding device along a generating line 73. A shared support 74 for a torch 78 and for a cooling saddle 79 is arranged for movement along the line 73 in the direction indicated by the arrow. The support 74 includes an arm 75 outside the tube, plus another arm 76 which is inside the same tube, while a connecting upright 77 extends between the edges of the tubular layer which are not as yet united.

Figure 4:
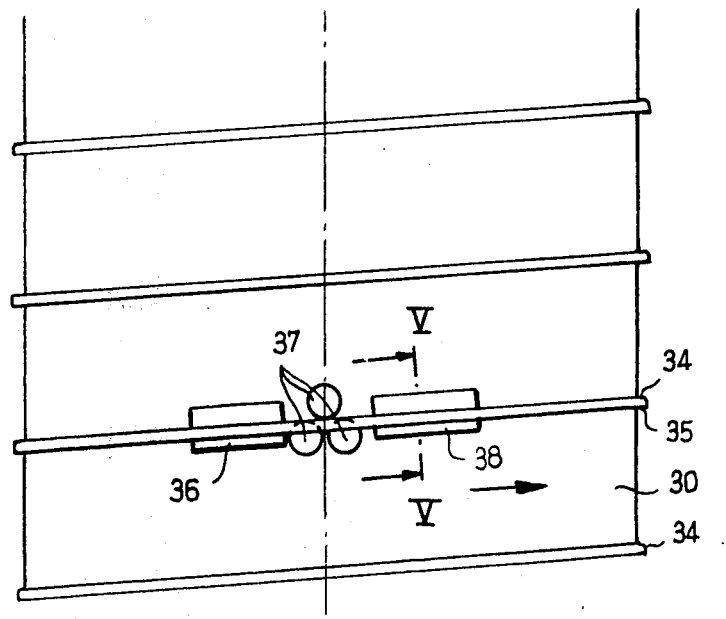
FIG. 4 is a partial schematic view, side elevation, of the same silo.

FIGS. 3, 4 and 5 are illustrative of a device for welding large silos by assembling galvanized sheets in a spiral. The coil of galvanized sheet 50 is arranged inside the silo to be constructed and is unwound, while roller elements 31 to give the sheet 30 the desired curve. Sheet 30 runs along a machine 33 which bends its upper and lower edges 34 and 35. Sheet 30 in unwound along a path indicated by arrow A so as to rest on the lower face of the silo. In the zone before the weld, that is, upline in relation to the movement, is arranged a double precooling saddle 36 in which is introduced the cryogenic fluid. Other groups of roller elements 37 bring the edges of the sheets to be welded perfectly together. Downline from these roller elements 37 is the welding station 80 in front of which is another double cooling saddle 38, also supplied with cryogenic fluid. These double saddles 36 and 38 preferably include tubular chambers 39 (FIG. 5) with a contact surface 40 of copper with fins 40'. The weld occurs at 60 as shown in FIG. 5. It is advantageous to provide for the escape of the cryogenic gas through holes 41 which face an interstitial clearance 42 between chamber 39 and edges 34 and 35 so that the gas is aimed along the back of sheet 30. The weld will preferably be performed with an automatic machine so that differences due to manual irregularities cannot influence the correct progress of the weld and cooling. Thus the silo is generated little by little turning it slowly, as the weld is made in the direction of arrow B.

The operation is the following: saddles 36 and 38 are brought to the cooling temperature and then the sheet is unwound from coil 50. The cylindrical part of the silo is turned while the weld is being made. The regulation of the introduction of the cryogenic fluid is done by recording the temperature of sheet 30 with thermocouple 43 which is placed immediately upline from saddle 38.

I claim:

1. A method for welding metal protected by a coating of a material which volatilizes at a temperature less than the welding or brazing temperature of the metal, the method comprising, in combination:
    forming a weld on the metal through the use of an electric arc;
    cooling a selected localized portion of the coating in the immediate vicinity of the weld by applying a cryogenic cooling fluid to the coating, to maintain said coating at a temperature below its volatization temperature during the formation of the weld;
    detecting the temperature of the coating portion during the formation of the weld; and
    adjusting the cooling effect of the cryogenic fluid in accordance with the detected temperature.

2. A method as defined in claim 1 which further comprises, in combination:
    precooling said portion of said coating prior to the formation of the weld.

3. A method as defined in claim 1, in which the coating is cooled during the formation of the weld, and the cryogenic fluid is liquid nitrogen.

4. A method for welding metal protected by a coating of a material which volatilizes at a temperature less than the welding or brazing temperature of the metal, the method comprising, in combination:
    forming a weld on the metal through the use of an electric arc;
    vaporizing a cryogenic cooling fluid within a thermally conductive enclosure in contact with a selected localized portion of the coating in the immediate vicinity of the weld, to cool said portion of said coating by conduction during the formation of the weld;
    discharging vapor from said cryogenic fluid during the formation of the weld, the vapor being directed through apertures in said enclosure onto said coating to provide additional cooling of said coating portion, the combined conduction cooling and cooling by vaporization maintaining said coating at a temperature below its volatization temperature;
    detecting the temperature of the coating during the formation of the weld; and
    adjusting the amount of cryogenic fluid within said enclosure in accordance with the detected temperature.

5. Apparatus for welding metal pieces protected by a coating of a material which volatilizes at a temperature less than the welding or brazing temperature of the metal, the apparatus comprising, in combination:
    welding means for forming a weld between the metal pieces through the use of an electric arc;
    a support unit for maintaining the welding means in juxtaposition with the pieces being welded;
    cooling means in cooperative relationship with the welding means for applying a cryogenic cooling fluid to a selected localized portion of the coating in the immediate vicinity of the weld, the cryogenic fluid being applied to said coating during the formation of the weld to maintain said coating at a temperature below its volatization temperature;
    said cooling means including a cooling saddle having a wall of thermally conductive material in facing contact with said coating portion, said wall being separate from the metal being welded and being interposed between said metal and said cryogenic cooling fluid; and
    means for securing the cooling means to said support unit in fixed relationship with said welding means.

6. Apparatus for welding metal protected by a coating of a material which volatilizes at a temperature less than the welding or brazing temperature of the metal, the apparatus comprising, in combination:

welding means for forming a weld on the metal through the use of an electric arc;

a support unit for maintaining the welding means in juxtaposition with the pieces being welded;

cooling means in cooperative relationship with the welding means for applying a cryogenic cooling fluid to a selected localized portion of the coating in the immediate vicinity of the weld, the cryogenic fluid being applied to said coating during the formation of the weld to maintain said coating at a temperature below its volatization temperature;

said cooling means including a cooling saddle having a wall of thermally conductive material in facing contact with said coating portion, said wall being separate from the metal being welded and being interposed between said metal and said cryogenic cooling fluid, and conduit means for feeding the cryogenic fluid to the cooling saddle, the saddle defining a chamber having a plurality of apertures for discharging cryogenic fluid to the atmosphere adjacent said coating portion; and means for securing the cooling means to said support unit.

7. Apparatus for welding metal protected by a coating of a material which volatilizes at a temperature less than the welding or brazing temperature of the metal, the apparatus comprising, in combination:

welding means for forming a weld on the metal through the use of an electric arc;

a support unit for maintaining the welding means in juxtaposition with the pieces being welded;

cooling means in cooperative relationship with the welding means for applying a cryogenic cooling fluid to a selected localized portion of the coating in the immediate vicinity of the weld, the cryogenic fluid being applied to the coating during the formation of the weld to maintain said coating at a temperature below its volatization temperature;

said cooling means including a cooling saddle having a wall of thermally conductive material in facing contact with said coating portion, said wall being separate from the metal being welded and being interposed between said metal and said cryogenic cooling fluid; and means for securing the cooling means to said support unit in fixed relationship with said welding means, said welding means being supported adjacent one side of the metal being welded and said cooling means being supported adjacent the opposite side of said metal.

8. Apparatus for welding metal protected by a coating of a material which volatilizes at a temperature less than the welding or brazing temperature of the metal, the apparatus comprising, in combination:

welding means for forming a weld on the metal through the use of an electric arc;

a support unit for maintaining the welding means in juxtaposition with the pieces being welded;

cooling means in cooperative relationship with the welding means for applying a cryogenic cooling fluid to a selected localized portion of the coating in the immediate vicinity of the weld, the cryogenic fluid being applied to the coating during the formation of the weld to maintain said coating at a temperature below its volatization temperature;

said cooling means including a cooling saddle having a wall of thermally conductive material in facing contact with said coating portion, and conduit means for feeding the cryogenic fluid to the cooling saddle, said wall being separate from the metal being welded and being interposed between said metal and said cryogenic cooling fluid;

means for securing the cooling means to said support unit in fixed relationship with said welding means, said welding means being supported adjacent one side of the metal being welded and said cooling means being supported adjacent the opposite side of said metal;

means for detecting the temperature of the coating during the formation of the weld; and valve means connected to said conduit means for adjusting the amount of cryogenic fluid fed to said cooling saddle in accordance with the detected temperature.

9. Apparatus for welding metal protected by a coating of a material which volatilizes at a temperature less than the welding or brazing temperature of the metal, the apparatus comprising, in combination:

welding means for forming a weld on the metal through the use of an electric arc;

a support unit for maintaining the welding means in juxtaposition with the pieces being welded;

cooling means in cooperative relationship with the welding means for applying liquid nitrogen to a selected localized portion of the coating in the immediate vicinity of the weld, the liquid nitrogen being applied to the coating prior to and during the formation of the weld to maintain said coating at a temperature below its volatization temperature;

said cooling means including a cooling saddle having a wall of thermally conductive material in facing contact with said coating portion, and conduit means for feeding liquid nitrogen to the cooling saddle, the saddle defining a chamber having a plurality of apertures for discharging liquid nitrogen to the atmosphere adjacent said coating and at least one additional aperture in said thermally conductive wall;

means for securing the cooling means to said support unit in fixed relationship with said welding means, said welding means being supported adjacent one side of the metal being welded and said cooling means being supported adjacent the opposite side of said metal;

means for detecting the temperature of the coating during the formation of the weld; and valve means connected to said conduit means for adjusting the amount of liquid nitrogen fed to said cooling saddle in accordance with the detected temperature.

\* \* \* \* \*